United States Patent
Atchison et al.

(10) Patent No.: US 11,313,572 B2
(45) Date of Patent: *Apr. 26, 2022

(54) CONFIGURATION MANAGEMENT SYSTEMS FOR HEATING, VENTILATION, AND AIR CONDITIONING (HVAC) SYSTEMS

(71) Applicant: Johnson Controls Technology Company, Auburn Hills, MI (US)

(72) Inventors: Shaun B. Atchison, Wichita, KS (US); Tom R. Tasker, Andover, KS (US); Noel A. Grajeda-Trevizo, Newton, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/841,275

(22) Filed: Apr. 6, 2020

(65) Prior Publication Data

US 2020/0232668 A1    Jul. 23, 2020

Related U.S. Application Data

(63) Continuation of application No. 15/926,130, filed on Mar. 20, 2018, now Pat. No. 10,612,803.

(Continued)

(51) Int. Cl.
*F24F 11/80* (2018.01)
*F24F 11/30* (2018.01)
(Continued)

(52) U.S. Cl.
CPC ............... *F24F 11/30* (2018.01); *F24F 1/20* (2013.01); *F24F 11/32* (2018.01); *F24F 11/52* (2018.01);
(Continued)

(58) Field of Classification Search
CPC ........................................................ F24F 11/80
(Continued)

(56) References Cited

U.S. PATENT DOCUMENTS 4,211,089 A    7/1980    Mueller et al.
5,237,826 A    8/1993    Baldwin et al.
(Continued)

FOREIGN PATENT DOCUMENTS

EP    2916082    1/2018
WO    2012151037    11/2012

OTHER PUBLICATIONS

Sileberstein, Heat Pump Basic, System Help Center, Jun. 17, 2014, p. 16.
Clivet, Energy Light User's Guide, Jan. 2001, p. 67.

*Primary Examiner* — Suresh Suryawanshi
(74) *Attorney, Agent, or Firm* — Fletcher Yoder, P.C.

(57) ABSTRACT

A configuration management system for a heating, ventilation, and air conditioning (HVAC) system includes a controller having a memory storing a baseline configuration of the HVAC system. The baseline configuration of the HVAC system indicates that the HVAC system is an air conditioning system or a heat pump system. Additionally, the controller is configured to determine a current configuration of the HVAC system based on detecting whether a reversing valve is present in the HVAC system. The current configuration of the HVAC system includes an air conditioning system configuration or a heat pump system configuration. The controller is also configured to perform a control action in response to determining that the current configuration is different than the baseline configuration.

20 Claims, 8 Drawing Sheets

Related U.S. Application Data

(60) Provisional application No. 62/635,769, filed on Feb. 27, 2018.

(51) Int. Cl.
| | |
|---|---|
| *F24F 1/20* | (2011.01) |
| *F24F 11/52* | (2018.01) |
| *F24F 11/88* | (2018.01) |
| *F24F 11/89* | (2018.01) |
| *F25B 29/00* | (2006.01) |
| *F24F 11/70* | (2018.01) |
| *F25B 30/02* | (2006.01) |
| *F24F 11/32* | (2018.01) |
| *F24F 11/64* | (2018.01) |
| *F25B 13/00* | (2006.01) |
| *F24F 11/61* | (2018.01) |
| *F25B 41/39* | (2021.01) |

(52) U.S. Cl.
CPC .............. *F24F 11/64* (2018.01); *F24F 11/70* (2018.01); *F24F 11/88* (2018.01); *F24F 11/89* (2018.01); *F25B 13/00* (2013.01); *F25B 29/003* (2013.01); *F25B 30/02* (2013.01); *F24F 11/61* (2018.01); *F24F 11/80* (2018.01); *F24F 2221/54* (2013.01); *F25B 41/39* (2021.01); *F25B 2313/0292* (2013.01); *G05B 2219/2614* (2013.01)

(58) Field of Classification Search
USPC ........................................................ 700/276
See application file for complete search history.

(56) References Cited

U.S. PATENT DOCUMENTS

| | | |
|---|---|---|
| 5,276,630 A | 1/1994 | Baldwin et al. |
| 7,402,780 B2 | 7/2008 | Mueller et al. |
| 7,849,698 B2 | 12/2010 | Harrod et al. |
| 8,242,723 B2 | 8/2012 | Green |
| 2006/0196200 A1 | 9/2006 | Harrod et al. |
| 2010/0076605 A1* | 3/2010 | Harrod .................... F24F 11/30 700/276 |
| 2010/0146995 A1 | 6/2010 | Mathews |
| 2012/0279241 A1 | 11/2012 | Ruiz |
| 2015/0184920 A1 | 7/2015 | Vie et al. |
| 2015/0184921 A1 | 7/2015 | Vie et al. |
| 2015/0184922 A1 | 7/2015 | Vie et al. |
| 2015/0184924 A1 | 7/2015 | Vie et al. |
| 2015/0260437 A1 | 9/2015 | Leman et al. |
| 2018/0283716 A1* | 10/2018 | Ribbich .................. F24F 11/49 |
| 2018/0292102 A1* | 10/2018 | Mowris .................... F24F 11/46 |

* cited by examiner

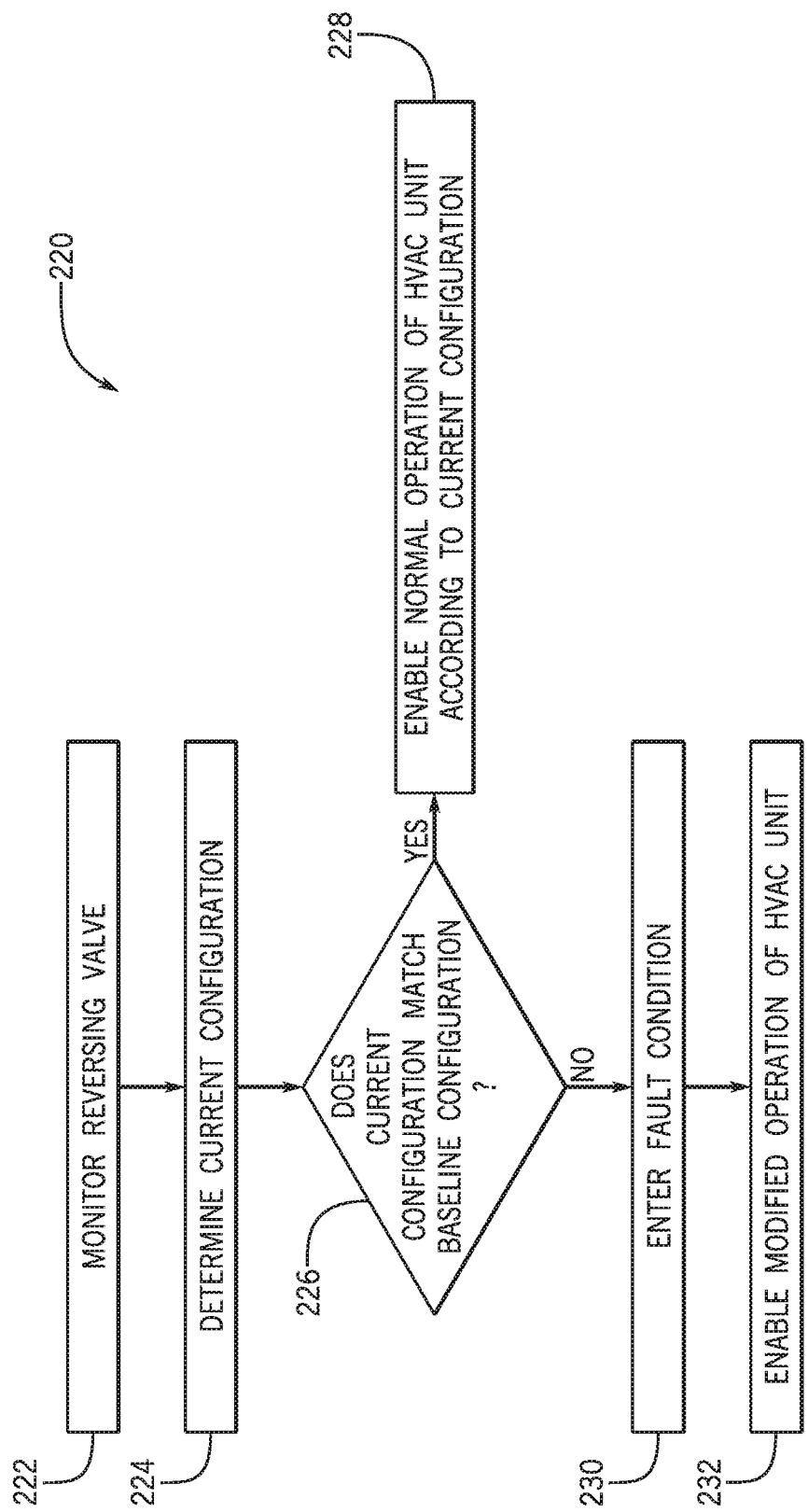

CONFIGURATION MANAGEMENT SYSTEMS FOR HEATING, VENTILATION, AND AIR CONDITIONING (HVAC) SYSTEMS

CROSS-REFERENCE TO RELATED APPLICATION

This application is a continuation of U.S. patent application Ser. No. 15/926,130, entitled "CONFIGURATION MANAGEMENT SYSTEMS FOR HEATING, VENTILATION, AND AIR CONDITIONING (HVAC) SYSTEMS," filed Mar. 20, 2018, which claims priority to and the benefit of U.S. Provisional Application No. 62/635,769, entitled "CONFIGURATION MANAGEMENT SYSTEMS FOR HEATING, VENTILATION, AND AIR CONDITIONING (HVAC) SYSTEMS," filed Feb. 27, 2018, which are hereby incorporated by reference in their entirety.

BACKGROUND

The present disclosure relates generally to heating, ventilation, and air conditioning (HVAC) systems, and more particularly, to configuration management systems for HVAC systems.

Residential, light commercial, commercial, and industrial systems are used to control temperatures and air quality in buildings. To condition a building, a HVAC system may circulate a refrigerant through a refrigerant circuit between an evaporator where the refrigerant absorbs heat and a condenser where the refrigerant releases heat. The refrigerant flowing within the refrigerant circuit is generally formulated to undergo phase changes within the normal operating temperatures and pressures of the HVAC system so that quantities of heat can be exchanged by virtue of the latent heat of vaporization of the refrigerant to provide conditioned air to the buildings.

In certain instances, a HVAC system may be configured as a heat pump system or an air conditioning system. One main difference between the two configurations relates to whether a reversing valve is included along the refrigerant circuit of the HVAC system. In general, a heat pump system includes the reversing valve, which enables the heat pump system to reverse a flow direction of the refrigerant, relative to a single flow direction of the refrigerant within the air conditioning system. As such, a heat pump system may either heat or cool the building via the circulating refrigerant, depending on the direction of the refrigerant flow. In contrast, an air conditioning system may cool the building via the circulating refrigerant and rely on auxiliary heaters or furnaces to heat the building.

To reduce manufacturing costs, a HVAC manufacturer may design control circuitry, such as a control panel or control board, that can be installed in either a heat pump system or an air conditioning system. For example, the control board may check for the presence of the reversing valve at start-up to determine whether it should control the HVAC system as a heat pump system or an air conditioning system. However, a HVAC system can be installed as a heat pump system and the reversing valve may subsequently fail or be removed. Under such circumstances, upon start-up, the control board may mistakenly determine that it is installed in an air conditioning system and attempt to operate the HVAC system accordingly, potentially damaging the HVAC system or reducing an operating efficiency of the HVAC system.

SUMMARY

In one embodiment of the present disclosure, a configuration management system for a heating, ventilation, and air conditioning (HVAC) system includes a controller having a memory storing a baseline configuration of the HVAC system. The baseline configuration of the HVAC system indicates that the HVAC system is an air conditioning system or a heat pump system. Additionally, the controller is configured to determine a current configuration of the HVAC system based on detecting whether a reversing valve is present in the HVAC system. The current configuration of the HVAC system includes an air conditioning system configuration or a heat pump system configuration. The controller is also configured to perform a control action in response to determining that the current configuration is different than the baseline configuration.

In another embodiment of the present disclosure, a controller for a heating, ventilation, and air conditioning (HVAC) system includes a reversing valve terminal assembly configured to be communicatively coupled to a reversing valve. The controller also includes memory circuitry storing a baseline configuration of the HVAC system. The baseline configuration of the HVAC system indicates that the HVAC system is an air conditioning system or a heat pump system. Additionally, the controller includes processing circuitry communicatively coupled to the reversing valve terminal assembly and the memory circuitry. The processing circuitry is configured to determine a current configuration of the HVAC system based on detecting whether the reversing valve is coupled to the reversing valve terminal assembly. The current configuration of the HVAC system includes an air conditioning system configuration or a heat pump system configuration. The processing circuitry is also configured to perform a control action in response to determining that the current configuration is different than the baseline configuration.

In a further embodiment of the present disclosure, a tangible, non-transitory, computer-readable medium, includes instructions executable by at least one processor of a configuration management system for a heating, ventilation, and air conditioning (HVAC) system that, when executed by the at least one processor of a HVAC controller, cause the at least one processor to monitor whether a reversing valve is coupled to a first terminal and a second terminal of the HVAC controller. The instructions, when executed by the at least one processor, cause the at least one processor to determine a current configuration of the HVAC system. The current configuration includes an air conditioning system configuration when the reversing valve is not coupled to the first terminal and the second terminal, and the current configuration includes a heat pump system configuration when the reversing valve is coupled to the first terminal and the second terminal. The instructions, when executed by the at least one processor, also cause the at least one processor to perform a control action in response to determining that the current configuration is different than a baseline configuration of the HVAC system. The baseline configuration of the HVAC system indicates that the HVAC system is an air conditioning system or a heat pump system.

Other features and advantages of the present application will be apparent from the following, more detailed description of the embodiments, taken in conjunction with the accompanying drawings which illustrate, by way of example, the principles of the application.

BRIEF DESCRIPTION OF THE DRAWINGS

FIG. 8 is a flow diagram representing an embodiment of a process of monitoring a current configuration of the HVAC system via the configuration management system of FIG. 6, in accordance with present techniques.

DETAILED DESCRIPTION

As mentioned, a HVAC manufacturer may design control circuitry, such as a control board, to be installed in either a heat pump system or an air conditioning system, and the control circuitry may determine whether it is installed in the heat pump system or air conditioning system at each start-up of an HVAC system, and operate the HVAC system accordingly. However, if a reversing valve fails or is removed from a heat pump system, then upon start-up, the control board mistakenly determines that it is installed in an air conditioning system instead of the heat pump system, and attempts to operate the HVAC system accordingly, without recognizing an issue or failure within the system.

With the foregoing in mind, present embodiments are directed to a configuration management system for HVAC systems. The disclosed configuration management system includes a control board having suitable memory that stores a baseline or default configuration of a HVAC system, indicating that the system is either a heat pump system or an air conditioning system. The baseline configuration is initially set upon manufacture or installation of the HVAC system and can be updated by a service technician after installation or modification of the HVAC system. The disclosed control board includes suitable electronic sensing circuitry that enables the control board to determine when a reversing valve is properly coupled to the control board. Processing circuitry of the control board uses the electronic sensing circuity to verify an associated HVAC system as being either a heat pump system or an air conditioning system each time the baseline configuration is set, as well as during operation of the HVAC system. As such, the processing circuitry of the control board can determine, during operation, that the present configuration of the HVAC system does not match the baseline configuration, and generate a fault condition accordingly. Furthermore, under certain circumstances, the control board may still enable limited operation of the HVAC system while the fault condition remains, as discussed below. By maintaining the configuration of the HVAC system, the disclosed configuration management system enables monitoring of fault conditions overlooked by other control board designs. Additionally, the configuration management system enables the HVAC system to be seamlessly retrofit from one configuration to another, such that a service technician can instruct the control board to verify and store a new baseline configuration based on the absence or presence of the reversing valve in a modified HVAC system.

Figure 1:
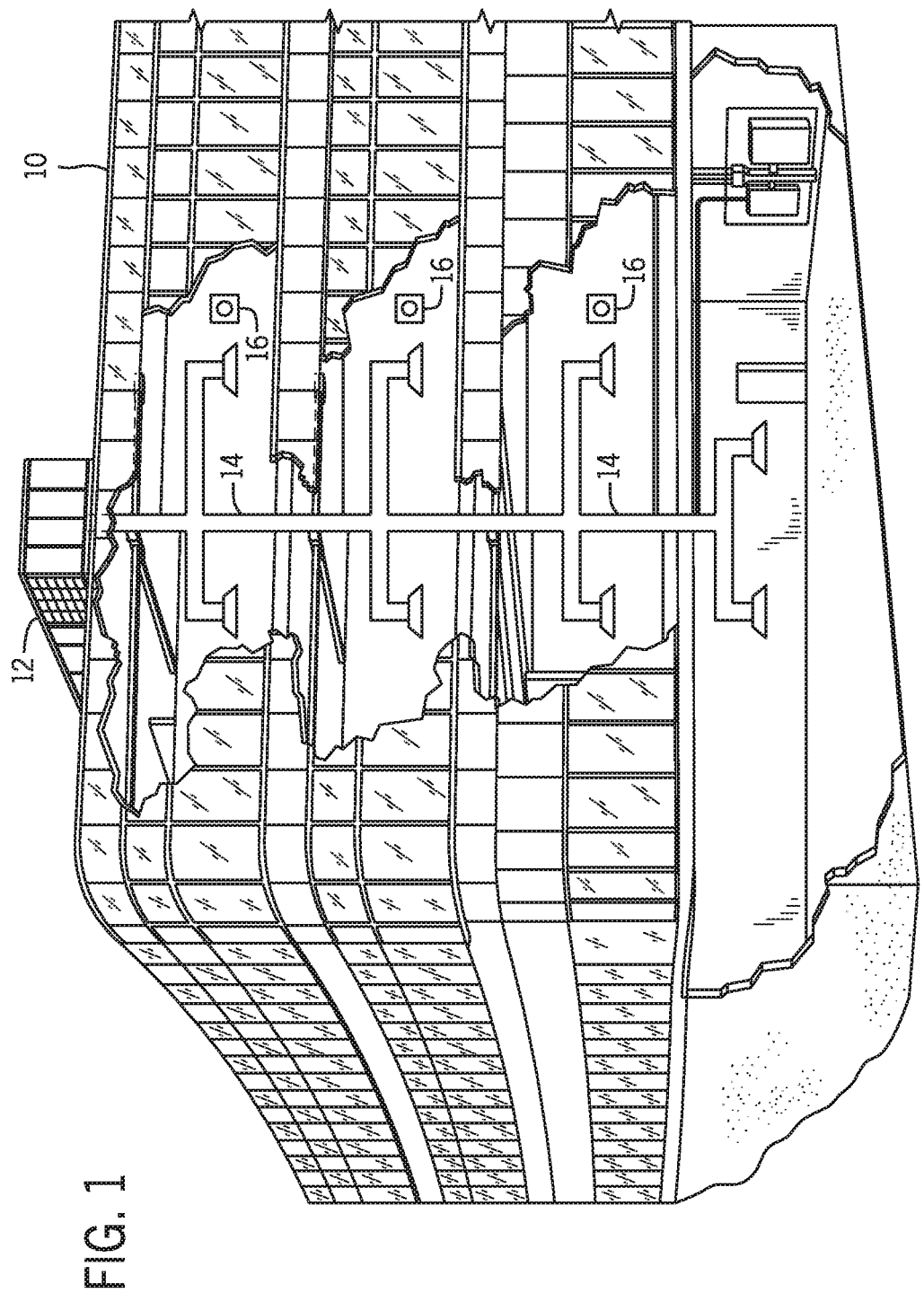
FIG. 1 is an illustration of an embodiment of a commercial or industrial HVAC system, in accordance with present techniques.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
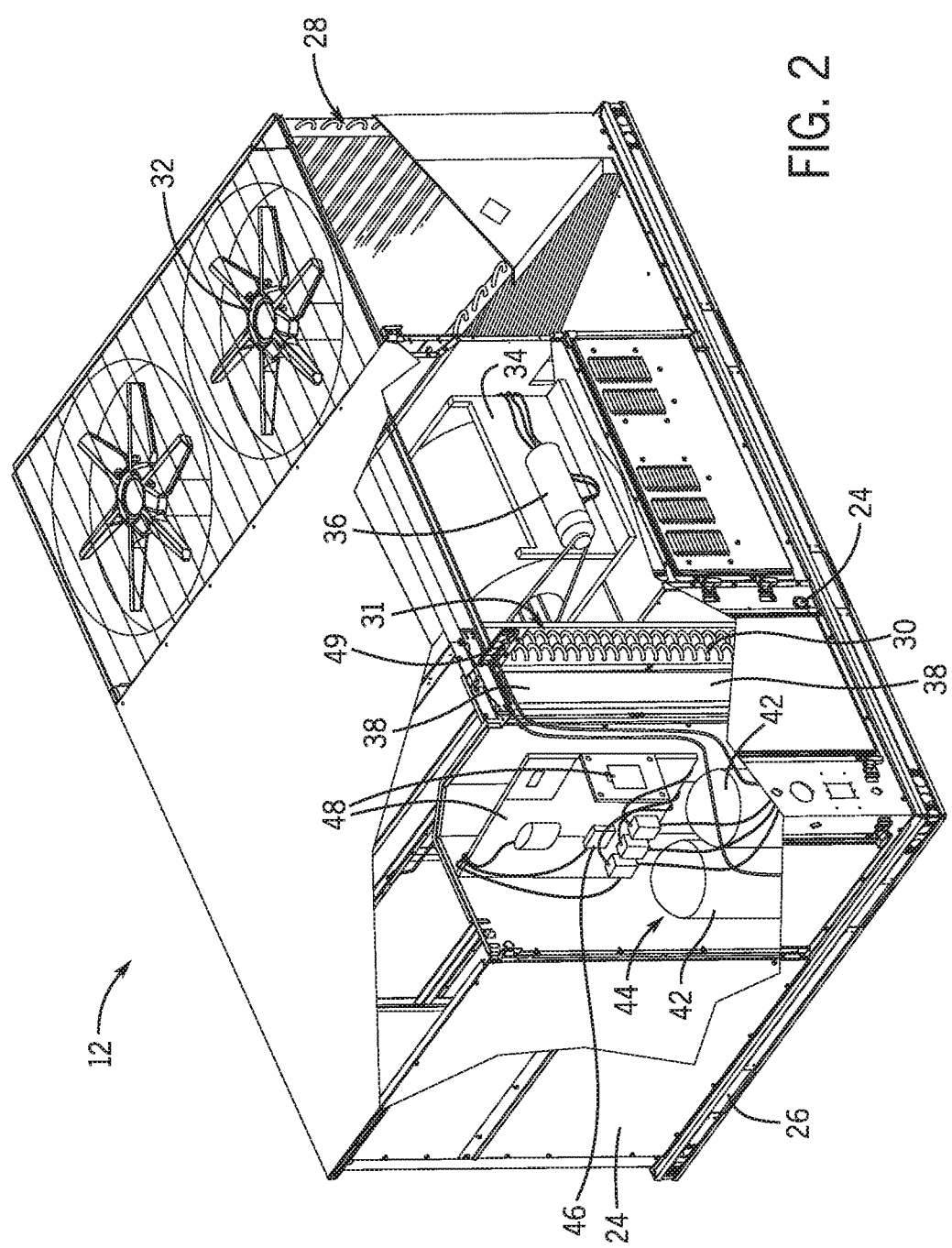
FIG. 2 is an illustration of an embodiment of a packaged unit of the HVAC system, in accordance with present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
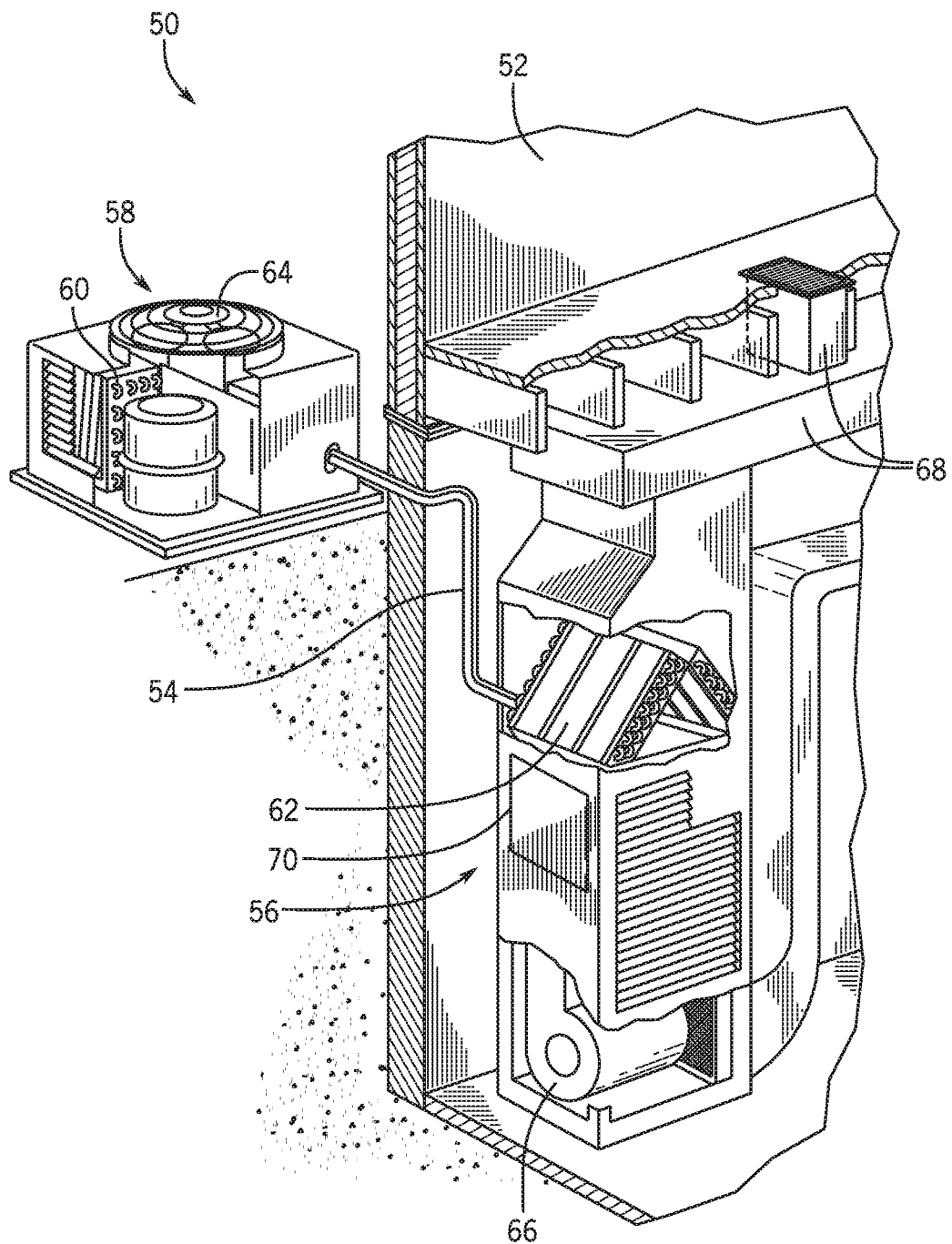
FIG. 3 is an illustration of an embodiment of a split system of the HVAC system, in accordance with present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
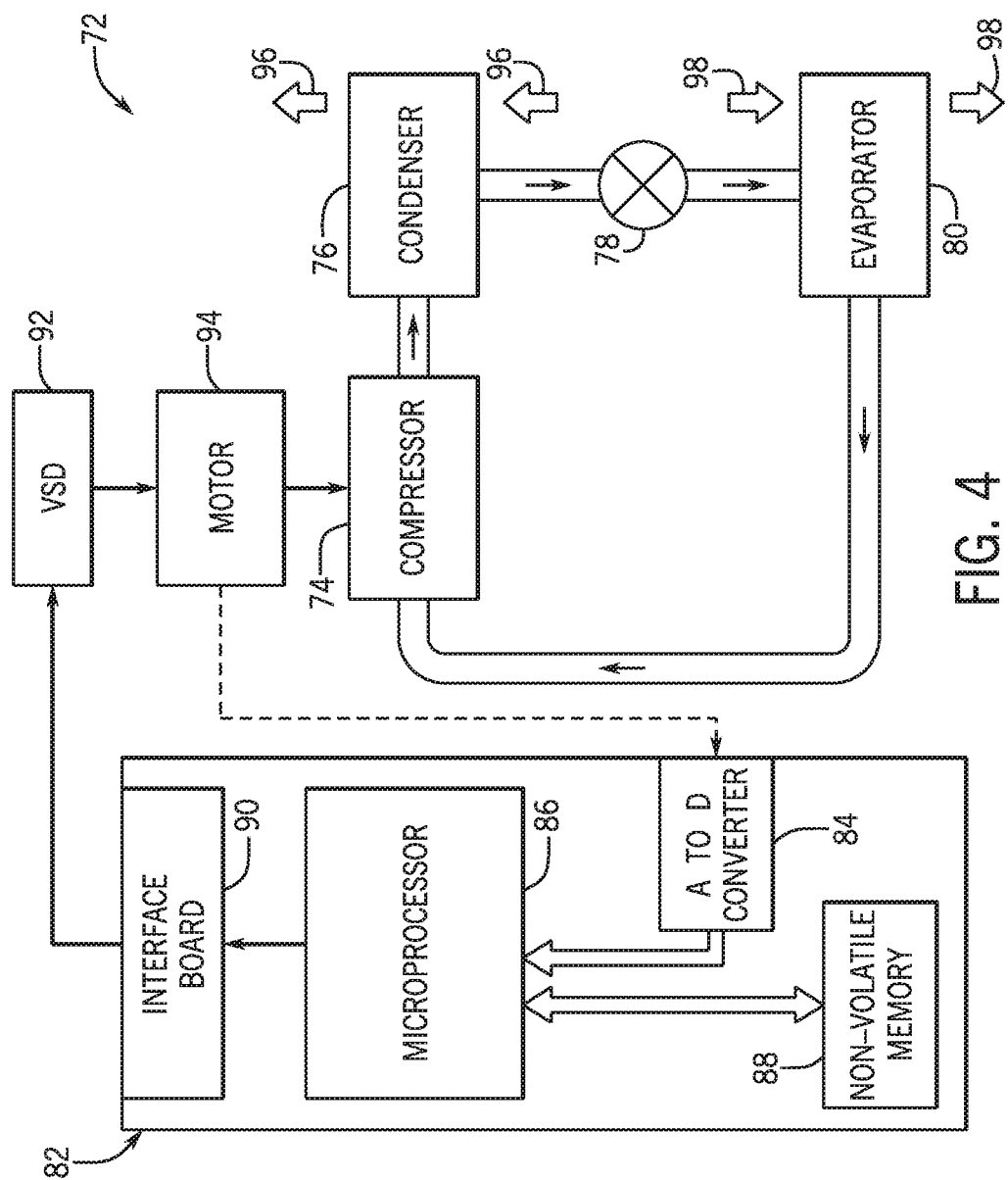
FIG. 4 is a schematic diagram of an embodiment of a refrigeration system of the HVAC system in an air conditioner configuration, in accordance with present techniques.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
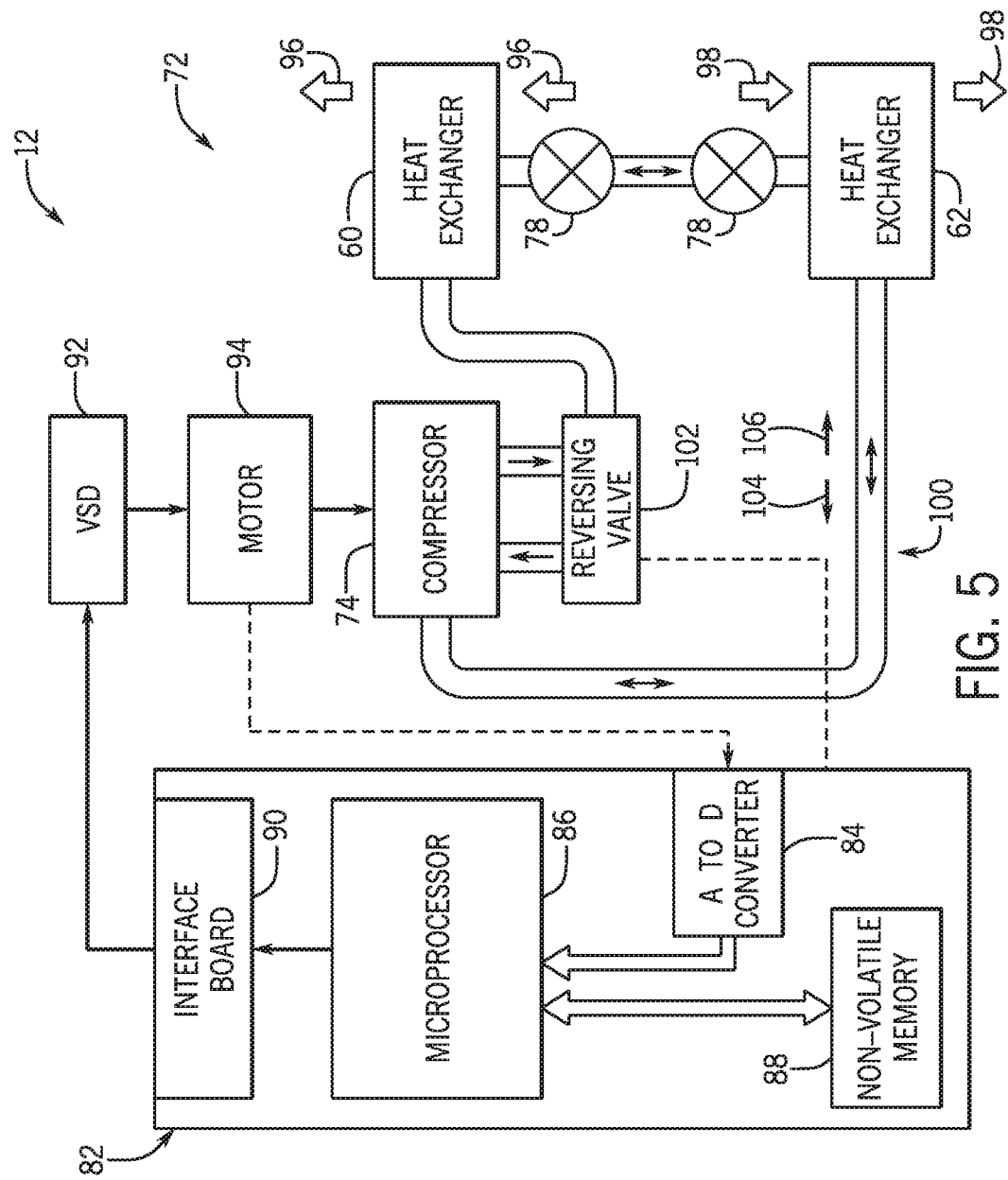
FIG. 5 is a schematic diagram of an embodiment of a refrigeration system of the HVAC system in a heat pump configuration, in accordance with present techniques.

FIG. 5 is an embodiment of the vapor compression system 72 including a heat pump system 100. In embodiments in which the HVAC system is the HVAC unit 12 having the heat pump system 100, the HVAC unit 12 further includes a reversing valve 102 fluidly coupled along a closed refrigerant path that can change or reverse a direction of the refrigerant flowing between the outdoor heat exchanger 60 and indoor heat exchanger 62, thus causing the outdoor heat exchanger 60 to operate as an evaporator and the indoor heat exchanger 62 to operate as a condenser. In this manner, the heat pump system 100 is capable of both heating and cooling the interior space of the building 10 based on vapor compression of the refrigerant. Moreover, in the present embodiments, a relaxed state of the reversing valve 102 corresponds to a heating flow direction 104 that heats the interior space of the building 10, while an energized state of the reversing valve 102 corresponds to a cooling flow direction 106 that cools the interior space of the building 10. However, in other embodiments, the relaxed state and the energized state of the reversing valve 102 are switched. Thus, depending on whether the reversing valve 102 is present, the HVAC unit 12 operates via different control strategies to condition the interior space of the building 10. In the present embodiment, the vapor compression system 72 of the HVAC unit 12 also includes two expansion devices 78: one expansion device 78 for expanding refrigerant traveling in the heating flow direction 104 and a second expansion device 78 for expanding refrigerant traveling in the cooling flow direction 106. In such embodiments, bypass flow paths may be included to enable the refrigerant to bypass the expansion device 78 that is not suitable for the current heating or cooling operation.

As mentioned, the HVAC systems discussed herein may each include a configuration management system that monitors and controls the configuration of HVAC systems to enhance operation and reliability. The disclosed configuration management system generally includes suitable control circuitry, such as the control board 48 and/or the control panel 82, configured to verify and set the baseline configuration of a HVAC system as an air conditioning system or a heat pump system based on the presence of the reversing valve 102 within the HVAC system at the time of manufacturing or installation of the HVAC system. In some embodiments, the baseline configuration, the current configuration, or both may be referred to as an air conditioning system configuration or a heat pump system configuration. Subsequently, the control circuitry monitors a current configuration of the HVAC system during operation, compares the current configuration to the stored baseline configuration, and performs various control actions based on the comparison. For example, the control board 48 can enable normal or modified operation of the HVAC system, enter a fault condition, and so forth, as discussed in greater detail below.

Figure 6:
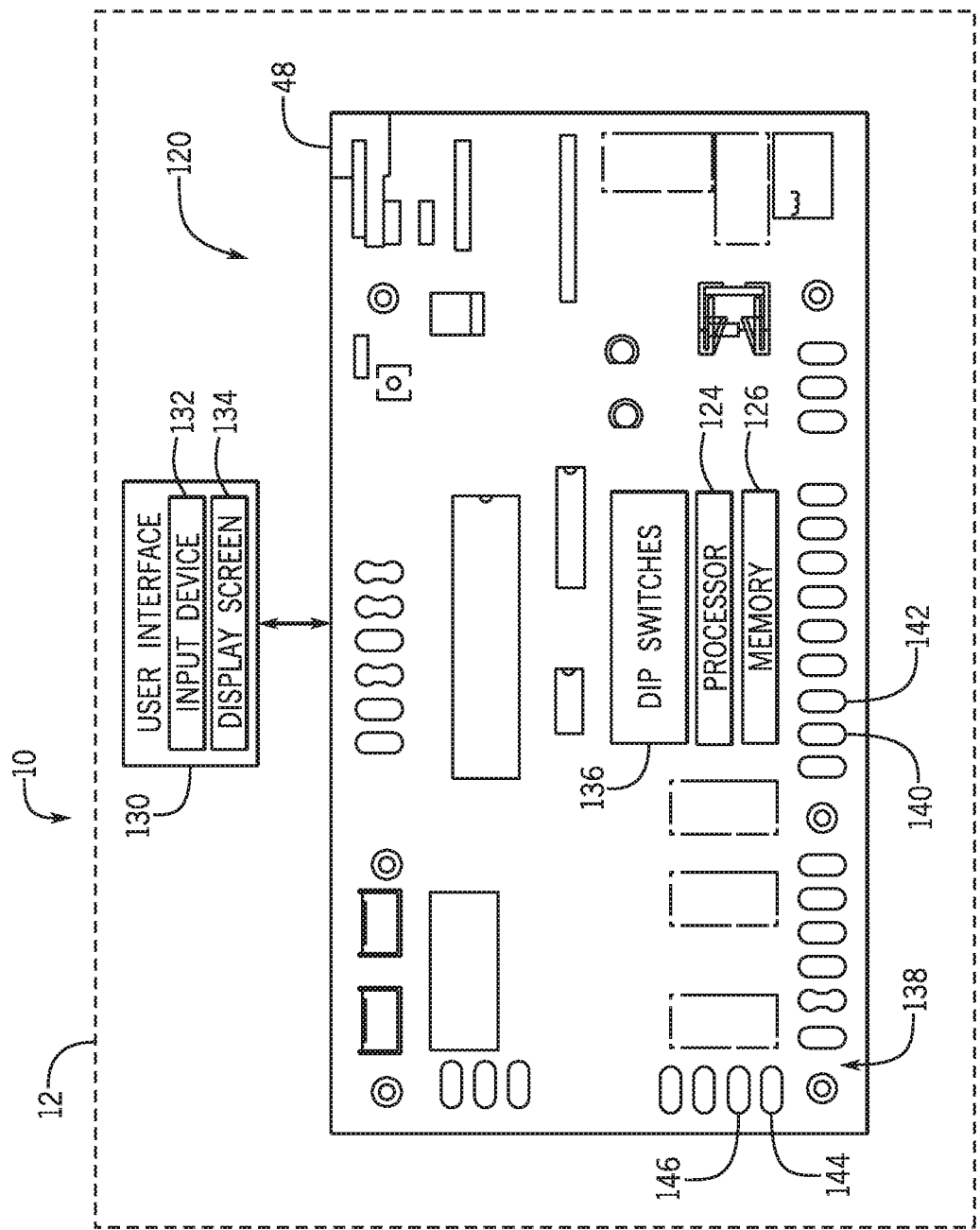
FIG. 6 is a schematic diagram of an embodiment of a configuration management system of the HVAC system, in accordance with present techniques.

For example, FIG. 6 illustrates an embodiment of the disclosed configuration management system 120. The illustrated embodiment of the configuration management system 120 includes the control board 48 of the HVAC unit 12 that instructs the HVAC unit 12 to condition an interior space of the building 10. During operation, the HVAC unit 12 generally circulates a refrigerant along a closed refrigerant path to exchange heat with an external environment that is outside of the building 10. The HVAC unit 12 is any suitable type of HVAC system having a suitable configuration as either an air conditioning system or a heat pump system. As discussed, the baseline configuration of the HVAC unit 12 is a parameter stored by the control board 48 that indicates whether the HVAC unit 12 was previously verified to be a heat pump system or an air conditioning system configuration.

The control board 48 may be provided within the HVAC unit 12 during manufacture or installation of the HVAC unit 12. In the illustrated embodiment, the control board 48 may be installed within either a heat pump system or an air conditioning system, thus improving manufacture and assembly of heat pump systems and air conditioning systems by reducing a demand for specialized parts for each system. The control board 48 operates as a configuration management controller that is also a main controller of the HVAC unit 12; however, the configuration management controller may alternatively be a separate controller communicatively coupled to the main HVAC controller, in other embodiments.

In the present embodiment, the configuration management system 120 of the control board 48 includes a processor 124, such as the previously-discussed microprocessor 86, and a memory 126, such as the previously-discussed non-volatile memory 88. Additionally, the control board 48 includes a user interface 130, dip switches 136, and multiple terminals 138. As such, the disclosed user interface 130 may be described or characterized as being a hardware-based user interface, as opposed to a software-based graphical user interface. The user interface 130 generally enables a user to provide instructions to and receive information from the control board 48. For example, the illustrated user interface 130 includes an input device 132, such as one or more user-selectable buttons, as well as a display screen 134 for displaying information. Additionally, the dip switches 136 of the present embodiment are multiple manually-set switches that indicate a tonnage or current tonnage for the HVAC unit 12. In other embodiments, the tonnage of the HVAC unit 12 is provided to the control board 48 in any other suitable manner, such as by user input provided via the user interface 130. Thus, the control board 48 may utilize the tonnage of the HVAC unit 12 for determining operational settings that produce requested heating and cooling loads.

As illustrated, the terminals 138 are connectors that are electrically coupled to a thermostat, as well as other components of the HVAC unit 12. In some embodiments, each terminal 138 transmits and/or receives signals and control signals to and from the components electrically coupled to the terminal 138. For example, in some embodiments, the thermostat is coupled to a Y1 terminal 140 of the control board 48 to enable the thermostat to call for first stage heating or cooling by sending a signal or voltage to the Y1 terminal 140 of the control board 48. Additionally, in some embodiments, the thermostat is coupled to a Y2 terminal 142 of the control board 48, such that the thermostat may call for second stage heating or cooling by sending a signal to the Y2 terminal 142 of the control board 48. Based on the inputs received via the terminals 138 and the user interface 130, the control board 48 may actuate or activate various components of the HVAC unit 12 via respective terminals 138, including blowers, compressors, and so forth. In other embodiments, other suitable terminals or load sensors may be employed in accordance with the techniques disclosed herein.

Further, for the illustrated embodiment, a reversing valve or RV terminal 144 and a reversing valve ground or RVG terminal 146 are included on the control board 48. When included within the HVAC unit 12, the reversing valve 102 is coupled to these terminals to enable the control board 48 to monitor and control the reversing valve 102. For example, the control board 48 may transmit control signals and/or receive feedback through the terminals 138. As such, the terminals 144, 146 enable the control board 48 to determine whether a reversing valve 102 is electrically coupled within the HVAC unit 12. In some embodiments, the terminals 144, 146 may be collectively referred to as a reversing valve terminal assembly. Indeed, as discussed in more detail below, the control board 48 senses a load or resistance load across the RV terminal 144 and the RVG terminal 146 to determine a current baseline of the HVAC unit 12 based on whether the reversing valve 102 is electrically coupled within the HVAC unit 12, as well as to control the HVAC unit 12 based on the current configuration. Processes for operating the configuration management system 120 having the control board 48 to manage the configuration of the HVAC unit 12 are described in more detail with reference to FIGS. 7 and 8 below.

Figure 7:
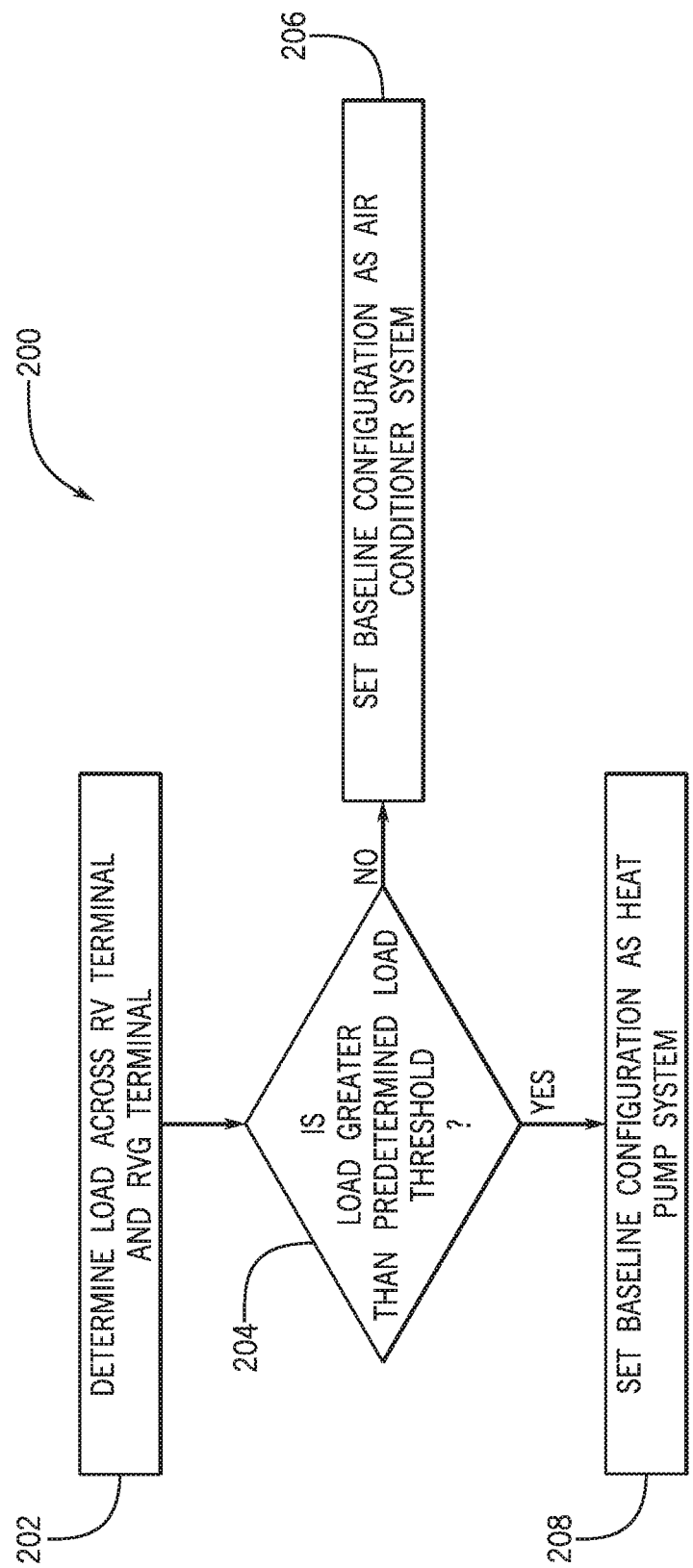
FIG. 7 is a flow diagram representing an embodiment of a process whereby the configuration management system of FIG. 6 sets a baseline configuration for the HVAC system, in accordance with present techniques.

FIG. 7 is a flow diagram illustrating an embodiment of a process 200 for detecting and setting a baseline configuration for the HVAC unit 12. It is to be understood that the steps discussed herein are merely exemplary, and certain steps may be omitted or performed in a different order than discussed herein. In some embodiments, the process 200 may be performed by the processor 124 of the control board 48, which may be a main HVAC controller of the HVAC unit 12, or by a separate controller or processor that is communicatively coupled to the main HVAC controller. Additionally, although the process 200 is discussed with reference to the control board 48 of FIG. 6 having the RV terminal 144 and the RVG terminal 146, the control board 48 may include any other suitable features for performing the steps discussed herein.

In the present embodiment, the control board 48 performs the process 200 to detect and set a baseline configuration for the HVAC unit 12 after a particular condition is met. In certain embodiments, the control board 48 may perform the process 200 during a first start-up or activation of the HVAC unit 12, for example, in response to an absence of a baseline configuration in the memory 126 of the control board 48. Additionally, the control board 48 may also perform the process 200 in response to receiving particular input from the input device 132 of the user interface 130 requesting that the baseline configuration be reset. A service technician may reset the baseline configuration in this manner, for example, after retrofitting the HVAC unit 12 to modify its configuration and/or to repair a failed reversing valve 102 of a heat pump system. Accordingly, when the baseline configuration of the control board 48 is not previously configured or is reset, the control board 48 determines the baseline configuration of the HVAC unit 12 based on the presence or absence of the reversing valve 102, and this baseline configuration is then stored within the memory 126.

To begin the illustrated embodiment of the process 200, the control board 48 determines a load or a resistance load across the RV terminal 144 and the RVG terminal 146, as indicated in block 202. Then, as indicated in block 204, the control board 48 determines whether the load is greater than a predetermined load threshold. The predetermined load threshold may be any suitable parameter, value, percentage, and so forth stored within the memory 126. For example, in an embodiment, the load threshold is set to zero watts (0 W), such that any detectable load across the terminals 144, 146 indicates the presence of the reversing valve 102. However, any other suitable load threshold may also be used by the techniques disclosed herein. In general, when the reversing valve 102 is electrically coupled across the terminals 144, 146, the reversing valve 102 acts as a resistor that draws an electrical load that is greater than the predetermined load threshold. As such, when the load is greater than the predetermined load threshold, the control board 48 determines that the reversing valve 102 is properly coupled across the terminals 144, 146. Thus, in certain embodiments, the disclosed configuration management system 120 may be capable of distinguishing between a fully connected reversing valve, a partially disconnected reversing valve, and an absent reversing valve.

In response to determining that the load across the terminals 144, 146 is less than the predetermined load threshold, indicating an absence of the reversing valve 102, the control board 48 sets the baseline configuration as indicating an air conditioning system, as indicated in block 206. In some embodiments, the control board 48 stores the baseline configuration within the memory 126 of the control board 48. Thus, the control board 48 proceeds to operate the HVAC unit 12 according to the baseline configuration as an air conditioning system.

Alternatively, in response to determining that the load across the terminals 144, 146 is greater than the predetermined load threshold, indicating the presence of the reversing valve 102, the control board 48 sets the baseline configuration of the HVAC unit 12 being as a heat pump system, as indicated in block 208. The control board 48 also stores the baseline configuration within the memory 126 of the control board 48. Then, the control board 48 may proceed to operate the HVAC unit 12 according to the baseline configuration as a heat pump system.

As mentioned, to manually view or reset the stored baseline configuration, in some embodiments, a service technician may provide input to the input device 132 of the user interface 130. For example, the service technician may view the stored baseline configuration of the HVAC unit 12 in one of multiple ways. In some embodiments, the service technician may provide a short input to the input device 132, such as a user-selectable button, for less than a first threshold amount of time without a call for compressor operation. In some embodiments, the first threshold amount of time without a call for compressor operation is a duration of time without a request from the thermostat to activate the compressor for heating or cooling. Then, the display screen 134 of the user interface 130 displays a representation of the baseline configuration stored in the memory 126 of the control board 48. For example, the display screen 134 may indicate "HP" for a heat pump baseline configuration or indicate "AC" for an air conditioning baseline configuration.

In some embodiments, the technician may activate the user-selectable button for greater than a second predetermined threshold time without a call for compressor operation, thus instructing the display screen 134 to toggle between displaying the stored baseline configuration for a first period of time and a tonnage of the HVAC unit 12 as determined from the dip switches 136 for a second period of time. In some embodiments, the toggling information continues to display as long as the user-selectable button is activated. Further, the control board 48 of the present embodiment determines the tonnage of the HVAC unit 12 by receiving signals from the dip switches 136 of the control board 48. Moreover, in some embodiments in which the stored baseline configuration is reset or cleared, the current configuration of the HVAC unit 12 is detected and stored in the memory 126 in response to providing input to the input device 132 of the user interface 130 for a second predetermined threshold time without an active call for compressor operation. In such embodiments, after the second predetermined threshold time is reached, the control board 48 performs the process 200 again.

FIG. 8 is a flow diagram illustrating an embodiment of a process 220 of monitoring a current configuration of the HVAC unit 12 and controlling the HVAC unit 12 based on a comparison between the current configuration and the stored baseline configuration. It is to be understood that the steps discussed herein are merely exemplary, and certain steps may be omitted or performed in a different order than discussed herein. In some embodiments, the process 220 may be performed by the processor 124 of the control board 48, which may be a main HVAC controller of the HVAC unit 12, or by a separate controller or processor that is communicatively coupled to the main HVAC controller. Additionally, although the process 220 is discussed with reference to the control board 48 of FIG. 6 having the RV terminal 144 and the RVG terminal 146, the control board 48 may include any other suitable features for performing the steps discussed herein.

In the present embodiment, the control board 48 performs the process 220 to monitor the current configuration of the HVAC unit 12 and to control the HVAC unit 12 based on a comparison between the current configuration and the stored baseline configuration. In the present example, the stored baseline configuration was previously determined via the process 200 of FIG. 7. As such, the control board 48 may perform the process 220 each time the HVAC unit 12 is in an OFF-cycle or turned off, once for a threshold number of times that the HVAC unit 12 is in an OFF-cycle, after installation or reinstallation of the HVAC unit 12, upon request by a user via the user interface 130, after a change in the current configuration is sensed, or any other time after the initial baseline configuration is stored in the memory 126. Accordingly, the configuration management system 120 is capable of dynamically determining and adjusting control of the HVAC unit 12 to adapt to a current configuration of the HVAC unit 12.

To begin the illustrated embodiment of the process 220, the control board 48 monitors the reversing valve 102, as indicated in block 222. For example, in an embodiment, the control board 48 monitors the reversing valve 102 by determining whether the load across the RV terminal 144 and the RVG terminal 146 is greater than a predetermined load threshold, as discussed above with reference to blocks 202 and 204 of FIG. 7. Thus, the control board 48 may determine that a functioning reversing valve 102 is included within the HVAC unit 12 in response to determining that the load across the terminals 144, 146 is greater than the predetermined load threshold. The control board 48 may determine the load across the terminals 144, 146 after a certain condition is met, such as each time the HVAC unit 12 is in an OFF-cycle or turned off, once for a threshold number of times that the HVAC unit 12 is in an OFF-cycle, after installation or reinstallation of the HVAC unit 12, upon request by a user through the user interface 130, after a change across the terminals 144, 146 is sensed, and so forth. Further, in some embodiments, the control board 48 monitors the reversing valve 102 during an ON-cycle or active operation of the HVAC unit 12. Then, the control board 48 may perform additional actions discussed herein during or after the ON-cycle is completed. In certain embodiments, the control board 48 also stores values of the load across the terminals 144, 146 within the memory 126 for later retrieval or analysis.

Based on the monitoring of the reversing valve 102, the control board 48 next determines the current configuration of the HVAC unit 12, as indicated in block 224. In the present embodiment, the control board 48 determines that the current configuration is as an air conditioning system when a reversing valve 102 is not determined to be present within the HVAC unit 12, and the control board 48 determines that the current configuration is as a heat pump system when a functioning reversing valve 102 is determined to be present within the HVAC unit 12, based on the monitoring indicated in block 222.

In the present embodiment of the process 220, after determining the current configuration of the HVAC unit 12, the control board 48 determines whether the current configuration matches the stored baseline configuration of the HVAC unit 12, as indicated in block 226. In some embodiments, the stored baseline configuration is determined and set via the process 200 of FIG. 7, although the stored baseline configuration may be set by another suitable process. Thus, by comparing the current configuration to the stored baseline configuration, the control board 48 can determine whether the configuration of the HVAC unit 12 has changed due to modification or part failure.

In response to determining that the current configuration matches the stored baseline configuration of the HVAC unit 12, the control board 48 enables normal operation of the HVAC unit 12, as indicated in block 228. For example, the control board 48 may unlock or enable normal operations of the HVAC unit 12, such that any subsequent ON-cycles are performed to condition the interior space in accordance with a selected operating mode. For example, when the current configuration and the stored baseline configuration both indicate an air conditioning system, the control board 48 enables the HVAC unit 12 to suitably operate in an air conditioning mode. When the current configuration and the stored baseline configuration both indicate a heat pump system, the control board 48 enables the HVAC unit 12 to suitably operate in a heat pump mode.

However, in response to determining that the current configuration does not match the stored baseline configuration of the HVAC unit 12, the control board 48 performs a suitable control action. For example, as illustrated, the control board 48 enters a fault condition, as indicated in block 230. That is, the control board 48 may generate and transmit a fault code associated with the mismatch to a communication device associated with a user and/or a service technician, to the user interface 130, and so forth. In response to the received fault code, the service technician may service the HVAC unit 12 by repairing or replacing the reversing valve 102 and/or initiating the process 200 of FIG. 7 to determine and set the baseline configuration of the HVAC unit 12.

Continuing through the illustrated embodiment, as indicated in block 232, the control board 48 also enables modified operation of the HVAC unit 12 in response to determining that the current configuration does not match the stored baseline configuration. In some embodiments, the modified operation of the HVAC unit 12 is particular or adapted to the current configuration of the HVAC unit 12. For example, in response to determining at block 226 that the current configuration does not match the stored baseline configuration, the control board 48 of the present embodiment generates one of the following fault conditions: "was HP, now AC" or "was AC, now HP." Then, depending on whether heating or cooling of the interior space of the building is requested, the control board 48 can operate the HVAC unit 12 in a particular manner, as discussed below.

Indeed, looking now to certain examples of modified operation of the HVAC unit 12, in an example, the stored baseline configuration of the HVAC unit 12 indicates a heat pump system and the control board 48 determines that the current configuration is an air conditioning system while cooling of the interior space of the building 10 is requested. For this example, the control board 48 blocks or prevents the HVAC unit 12 from performing a cooling operation. In other words, because the stored baseline configuration indicates that the HVAC unit 12 should include the reversing valve 102, and because the reversing valve 102 is not detected, the heat pump system can only drive refrigerant in a single direction that is associated with heating the interior of the building 10. As such, the control board 48 blocks the compressor 74 of the HVAC unit 12 from activating to respond to a request for cooling and instructs the display screen 134 to display the fault condition "was HP, now AC."

In another example, the stored baseline configuration of the HVAC unit 12 indicates a heat pump system and the control board 48 determines that the current configuration is an air conditioning system while heating of the interior space of the building 10 is requested. In this situation, the control board 48 enables operation of the compressor 74 of the HVAC unit 12 to heat the interior space of the building 10. Indeed, in certain embodiments, compressor heating and auxiliary heating modes can be performed, while traditional defrost modes are blocked from being performed. As referred to herein, "compressor heating" indicates heating of the interior space of the building 10 due to activation of the compressor 74, which drives refrigerant through the heat pump system, thus enabling the heating of supply air. Because traditional defrosting modes for the outdoor heat exchanger 60 of the HVAC unit 12 employ the reversing valve 102 to reverse the flow direction of the refrigerant, the control board 48 of the present example may, alternatively, perform a modified defrost mode or a reversing-valveless defrost mode that does not rely on the reversing valve 102. Instead, the modified defrost mode of the present embodiment is performed by deactivating the compressor 74 and by activating the auxiliary heaters until the heating mode and/or the defrost mode are complete. Therefore, the refrigerant stops flowing through and chilling the outdoor heat exchanger 60, thus enabling the outdoor heat exchanger 60 to approach an ambient temperature that melts frost or other frozen liquid off of the outdoor heat exchanger 60. Accordingly, the configuration management system 120 of the control board 48 enables the HVAC unit 12 to heat the interior space of the building 10 and defrost the outdoor heat exchanger 60, even while a fault condition is present. In some embodiments, the fault condition "was HP, now AC" is also displayed.

In another example, the stored baseline configuration of the HVAC unit 12 is an air conditioning system and the control board 48 determines that the current configuration is a heat pump system while cooling of the interior space of the building 10 is requested. For this example, the control board 48 instructs the display screen of the user interface 130 to display the fault condition "was AC, now HP." That is, because the control board 48 determines that the electrical connection to the reversing valve 102 is present, the control board 48 determines that the cooling mode operation may not be performed. Thus, when the stored baseline configuration indicates an air conditioning system, the control board 48 locks out compressor operation when a cooling operation is requested and a fault condition is present. Indeed, in some embodiments, a heat pump system may be retrofitted to be an air conditioning system by removing the reversing valve 102. However, because the heat pump system may include other components that are not present within an air conditioning system, only removing the reversing valve 102 may not be sufficient to adapt the heat pump system to an air conditioning system. Further, under conditions in which heating is requested, the control board 48 may activate the auxiliary heaters and/or instruct the user interface to display the fault condition.

In some embodiments, the configuration management system 120 of the control board 48 unlocks normal operation of the HVAC unit 12 only after the fault condition is cleared, such as by resetting the baseline configuration of the HVAC unit 12 according to the process 200 of FIG. 6. Additionally, certain operations of the HVAC unit 12, such as compressor activation or defrost activation, may be unlocked after a service technician provides credentials to the control board 48 via the user interface 130. In some embodiments, HVAC unit 12 is retrofitted from an air conditioning system to a heat pump system or vice versa. In such embodiments, the disclosed configuration management system 120 enables the control board 48 to rapidly identify and adapt to the new configuration of the HVAC unit 12. Moreover, under certain conditions, the electrical connections between the reversing valve 102 and the terminals 144, 146 may be loosened or decoupled, such that the control board 48 can alternatively identify this disconnection and flag a service technician to repair the HVAC unit 12, without changing the stored baseline configuration of the HVAC unit 12.

Accordingly, the present disclosure is directed to a configuration management system that detects, stores, verifies, and monitors a configuration of a HVAC unit as being either an air conditioning system or a heat pump system. The control board of the disclosed configuration management system determines an initial baseline configuration during an initialization phase, manufacturing, or installation based on the presence or absence of a reversing valve, and then stores this baseline configuration in memory. During subsequent operation of the HVAC unit, the control board monitors and compares a current configuration of the HVAC unit to the stored baseline configuration to determine whether the reversing valve has been added to or removed from the HVAC unit. If a change is detected between the stored baseline configuration and the current configuration, the configuration management system can enter a fault condition and modify operation of the HVAC unit based on the specific fault. As such, the configuration management system improves the reliability of the HVAC unit, while still enabling common control circuitry for use in both heat pump and air conditioning systems.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method of operating a heating, ventilation, and air conditioning (HVAC) system, comprising:
determining, via a controller of the HVAC system, a current configuration of the HVAC system based on monitoring a reversing valve terminal assembly of the controller, wherein the current configuration comprises an air conditioning system configuration or a heat pump system configuration;
comparing, via the controller, the current configuration to a baseline configuration of the HVAC system, wherein the baseline configuration indicates that the HVAC system was previously set with the air conditioning system configuration or the heat pump system configuration; and
performing, via the controller, a control action in response to determining that the current configuration is different than the baseline configuration, wherein performing the control action comprises operating the HVAC system without transmitting an activation signal via the reversing valve terminal assembly.

2. The method of claim 1, wherein performing the control action comprises deactivating a compressor and activating an auxiliary heater of the HVAC system in response to determining that a defrost mode is requested during a heating operation of the HVAC system.

3. The method of claim 1, wherein performing the control action comprises entering a fault condition and restricting operation of the HVAC system based on the fault condition.

4. The method of claim 3, comprising:
clearing the fault condition based on user input provided to a user-selectable interface communicatively coupled to the controller; and derestricting operation of the HVAC system in response to the fault condition being cleared.

5. The method of claim 1, wherein monitoring the reversing valve terminal assembly comprises detecting whether a reversing valve is electrically coupled across two terminals of the reversing valve terminal assembly.

6. The method of claim 5, wherein detecting whether the reversing valve is electrically coupled comprises determining whether a resistance load across the two terminals is greater than a predetermined resistance load threshold.

7. The method of claim 1, comprising detecting and storing the baseline configuration of the HVAC system before determining the current configuration of the HVAC system.

8. The method of claim 1, comprising detecting and storing the baseline configuration of the HVAC system:
during an initialization phase of the HVAC system that occurs after an initial start-up of the HVAC system; or
after receiving an indication that a user-selectable interface communicatively coupled to the controller has been selected for a threshold time period.

9. A controller for a heating, ventilation, and air conditioning (HVAC) system, comprising:
processing circuitry communicatively coupled to a reversing valve terminal assembly, wherein the processing circuitry is configured to:
monitor whether a reversing valve is coupled between a first terminal and a second terminal of the reversing valve terminal assembly;
determine a current configuration of the HVAC system, wherein the current configuration has an air conditioning system configuration when the reversing valve is not coupled between the first terminal and the second terminal, and wherein the current configuration has a heat pump system configuration when the reversing valve is coupled between the first terminal and the second terminal; and
perform a control action in response to determining that the current configuration is different than a baseline configuration of the HVAC system, wherein the baseline configuration indicates that the HVAC system was previously set with the air conditioning system configuration or the heat pump system configuration.

10. The controller of claim 9, wherein performing the control action comprises operating the HVAC system without transmitting an activation signal via the reversing valve terminal assembly.

11. The controller of claim 9, wherein performing the control action comprises entering a fault condition and restricting the HVAC system to operations that are not associated with activation of the reversing valve terminal assembly.

12. The controller of claim 9, wherein performing the control action comprises disabling cooling operation and enabling heating operation of the HVAC system.

13. The controller of claim 9, wherein the processing circuitry is configured to enable normal operation of the HVAC system according to the current configuration in response to determining that the current configuration is not different than the baseline configuration.

14. The controller of claim 9, comprising memory circuitry communicatively coupled to the processing circuitry and storing the baseline configuration.

15. A method of operating a heating, ventilation, and air conditioning (HVAC) system, comprising:
monitoring, via a controller of the HVAC system, whether a reversing valve is electrically coupled to a terminal assembly of the controller;
determining, via the controller, a current configuration of the HVAC system based on the monitoring, wherein the current configuration has an air conditioning system configuration when the reversing valve is not coupled to the terminal assembly, and wherein the current configuration has a heat pump system configuration when the reversing valve is coupled to the terminal assembly; and
performing, via the controller, a control action in response to determining that the current configuration is different than a baseline configuration of the HVAC system, wherein performing the control action comprises operating the HVAC system without activating the reversing valve.

16. The method of claim 15, comprising storing the baseline configuration during an initialization phase of the HVAC system, wherein the baseline configuration indicates that the HVAC system was previously set with the air conditioning system configuration or the heat pump system configuration.

17. The method of claim 16, wherein the initialization phase occurs after an initial start-up of the HVAC system or after receiving an indication that a user-selectable interface has been selected for at least a threshold time.

18. The method of claim 15, comprising storing the baseline configuration in response to detecting an absence of the baseline configuration in a memory of the controller.

19. The method of claim 15, wherein performing the control action comprises disabling cooling operation of the HVAC system and enabling heating operation of the HVAC system.

20. The method of claim 15, wherein performing the control action comprises performing a modified defrost mode in response to determining that a defrost operation of the HVAC system is requested, and wherein performing the modified defrost mode comprises instructing a compressor to deactivate and instructing an auxiliary heater to activate.

* * * * *